(12) United States Patent
Solbrig et al.

(10) Patent No.: US 9,605,573 B2
(45) Date of Patent: Mar. 28, 2017

(54) SYSTEM AND METHOD FOR GAS/LIQUID MIXING IN AN EXHAUST AFTERTREATMENT SYSTEM

(71) Applicant: GM GLOBAL TECHNOLOGY OPERATIONS LLC, Detroit, MI (US)

(72) Inventors: Charles E. Solbrig, Ypsilanti, MI (US); Melanie K. Corrigan, Royal Oak, MI (US); Ognyan N. Yanakiev, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 14 days.

(21) Appl. No.: 14/338,397

(22) Filed: Jul. 23, 2014

(65) Prior Publication Data
US 2016/0024985 A1 Jan. 28, 2016

(51) Int. Cl.
| | |
|---|---|
| *F01N 3/20* | (2006.01) |
| *F01N 3/10* | (2006.01) |
| *F01N 3/28* | (2006.01) |
| *F01N 3/021* | (2006.01) |
| *F01N 3/025* | (2006.01) |
| *B01F 3/04* | (2006.01) |
| *B01F 5/04* | (2006.01) |
| *B01F 5/06* | (2006.01) |

(52) U.S. Cl.
CPC .......... *F01N 3/106* (2013.01); *B01F 3/04049* (2013.01); *B01F 5/0473* (2013.01); *B01F 5/0612* (2013.01); *B01F 5/0616* (2013.01); *B01F 5/0618* (2013.01); *B01F 5/0654* (2013.01); *F01N 3/021* (2013.01); *F01N 3/0253* (2013.01); *F01N 3/2066* (2013.01); *F01N 3/2892* (2013.01); *B01F 2005/0639* (2013.01); *F01N 2610/02* (2013.01); *F01N 2610/03* (2013.01); *Y02T 10/24* (2013.01)

(58) Field of Classification Search
CPC ........ F02D 9/04; F01N 2240/20; F01N 1/166; F01N 13/02; F01N 13/10
USPC .. 60/273, 274, 285, 286, 301, 295, 299, 324
See application file for complete search history.

(56) References Cited

U.S. PATENT DOCUMENTS

| | | | | |
|---|---|---|---|---|
| 6,074,619 | A * | 6/2000 | Schoubye .......... | B01D 53/9431 423/213.2 |
| 7,059,118 | B2 * | 6/2006 | Ripper ................. | B01F 5/0268 60/286 |
| 7,581,387 | B2 * | 9/2009 | Bui ....................... | F01N 3/101 60/274 |
| 7,797,937 | B2 * | 9/2010 | Endicott ............. | F02B 29/0468 123/306 |

(Continued)

*Primary Examiner* — Patrick Maines
(74) *Attorney, Agent, or Firm* — Cantor Colburn LLP

(57) ABSTRACT

An exhaust treatment system for an internal combustion engine having improved mixing of an injected fluid comprises an exhaust gas conduit configured to receive exhaust gas from an internal combustion engine and to deliver the exhaust gas to the exhaust treatment system. A fluid injector in fluid communication with the exhaust gas conduit configured delivers a fluid into the exhaust gas and an evaporation volume disposed in the exhaust conduit downstream of the fluid injector is configured to slow the bulk velocity of the fluid and exhaust gas mixture to thereby increase the residence time of the exhaust gas mixture therein. An exhaust treatment device is configured to receive the fluid and exhaust gas mixture.

10 Claims, 3 Drawing Sheets

(56) References Cited

U.S. PATENT DOCUMENTS

| | | | | |
|---|---|---|---|---|
| 8,302,383 B2* | 11/2012 | Oesterle | ........ | F01N 3/206 60/286 |
| 2005/0172615 A1* | 8/2005 | Mahr | ........ | B01D 53/9431 60/286 |
| 2006/0075745 A1* | 4/2006 | Cummings | ........ | F01N 1/088 60/315 |
| 2009/0019843 A1* | 1/2009 | Levin | ........ | B01F 3/04049 60/303 |
| 2011/0067386 A1* | 3/2011 | Gonze | ........ | F01N 3/0231 60/297 |
| 2011/0194987 A1* | 8/2011 | Hodgson | ........ | F01N 3/2066 422/187 |
| 2013/0111886 A1* | 5/2013 | Gonze | ........ | F01N 9/00 60/286 |
| 2013/0269325 A1* | 10/2013 | Hadden | ........ | B01F 5/0689 60/297 |
| 2013/0333363 A1* | 12/2013 | Joshi | ........ | F01N 3/208 60/301 |
| 2014/0041370 A1* | 2/2014 | Solbrig | ........ | F01N 3/206 60/295 |

\* cited by examiner

SYSTEM AND METHOD FOR GAS/LIQUID MIXING IN AN EXHAUST AFTERTREATMENT SYSTEM

FIELD OF THE INVENTION

Exemplary embodiments of the invention are related to exhaust treatment systems and, more specifically, to exhaust treatment systems for internal combustion engines and vehicles incorporating the same.

BACKGROUND

Manufactures of internal combustion engines, particularly those used in automotive applications, must satisfy customer demands for performance while meeting various regulations for reduced exhaust emissions and improved vehicle economy. One example of a method for improving fuel economy is to operate an engine at an air/fuel ratio that is lean (excess oxygen) of stoichiometry. Examples of lean-burn engines include compression ignition (diesel) and lean-burn spark ignition engines. While lean-burn engines may improve fuel economy, the exhaust gas emitted from such an engine, particularly a diesel engine, is a heterogeneous mixture that contains gaseous emissions such as carbon monoxide ("CO"), unburned hydrocarbons ("HC") and oxides of nitrogen ("NOx") as well as condensed phase materials (liquids and solids) that may constitute particulate matter ("PM"). The efficient reduction of these exhaust gas constituents is important to meet emission standards and improve vehicle economy.

Several exhaust treatment systems have been proposed for vehicle applications that employ various exhaust treatment devices. One such treatment device employs a Selective Catalyst Reduction ("SCR") catalyst disposed on a catalyst support and a NOx reductant (e.g. liquid urea) that is injected upstream of the SCR catalyst. The NOx reductant/catalyst combination is effective to reduce the level of NOx in the exhaust gas in a known manner. An exhaust treatment system in use for reducing high levels of PM in the exhaust gas is the particulate filter ("PF") device. The filter is a physical structure for removing particulates from exhaust gas and, as a result, the accumulated particulates must be periodically removed through a regeneration process that involves increasing the temperature of the filter by injecting fuel directly into the exhaust system in a known manner.

In both of the exhaust treatment systems discussed above, the injected fluid requires a predetermined amount of time in the exhaust gas flow for proper preparation of the mixture (e.g. mixing of, or chemical conversion of, or vaporization of, or distribution of the fluid) before it can properly react to provide the desired benefit. Due to often limited packaging space, it is therefore desirable to provide a system and method that is capable of doing so in the shortest length possible.

SUMMARY OF THE INVENTION

In an exemplary embodiment an exhaust treatment system for an internal combustion engine having improved mixing of an injected fluid comprises an exhaust gas conduit configured to receive exhaust gas from an internal combustion engine and to deliver the exhaust gas to the exhaust treatment system. A fluid injector is in fluid communication with the exhaust gas conduit configured to deliver a fluid into the exhaust gas. A breakup mixer is disposed in the exhaust conduit downstream of the fluid injector and is configured to breakup fluid droplets. An evaporation volume is disposed in the exhaust conduit downstream of the breakup mixer and is configured to slow the bulk velocity of the fluid and exhaust gas mixture to thereby increase the residence time of the exhaust gas mixture therein. A distribution mixer is disposed in the exhaust conduit downstream of the evaporation volume and is configured to homogenize and distribute the fluid and exhaust gas mixture, and an exhaust treatment device is configured to receive the fluid and exhaust gas mixture.

In another exemplary embodiment a method of mixing a fluid in an exhaust gas in an exhaust treatment system for an internal combustion engine comprises delivering an exhaust gas from an internal combustion engine to an exhaust gas conduit configured to receive the exhaust gas and to deliver the exhaust gas to the exhaust treatment system, injecting a fluid into the exhaust gas through a fluid injector in fluid communication with the exhaust gas conduit, passing the exhaust gas and fluid mixture through a breakup mixer disposed in the exhaust conduit downstream of the fluid injector and configured to breakup fluid droplets, delivering the exhaust gas and fluid mixture to an evaporation volume disposed in the exhaust conduit downstream of the breakup mixer and configured to slow the bulk velocity of the mixture to thereby increase the residence time of the mixture therein, passing the exhaust gas and fluid mixture through a distribution mixer disposed in the exhaust conduit downstream of the evaporation volume and configured to homogenize and distribute the fluid and exhaust gas mixture and, delivering the exhaust gas and fluid mixture to an exhaust treatment device configured to receive the fluid and exhaust gas mixture.

In yet another embodiment an exhaust treatment system for an internal combustion engine having improved mixing of an injected fluid comprises an exhaust gas conduit configured to receive exhaust gas from an internal combustion engine and to deliver the exhaust gas to the exhaust treatment system, a fluid injector in fluid communication with the exhaust gas conduit configured to deliver a fluid into the exhaust gas, an evaporation volume disposed in the exhaust conduit downstream of the fluid injector and configured to slow the bulk velocity of the fluid and exhaust gas mixture to thereby increase the residence time of the exhaust gas mixture therein and, an exhaust treatment device configured to receive the fluid and exhaust gas mixture.

The above features, advantages and details appear by way of example only, in the following description of the embodiment, the description referring to the drawings in which.

DESCRIPTION OF THE EMBODIMENTS

Figure 1:
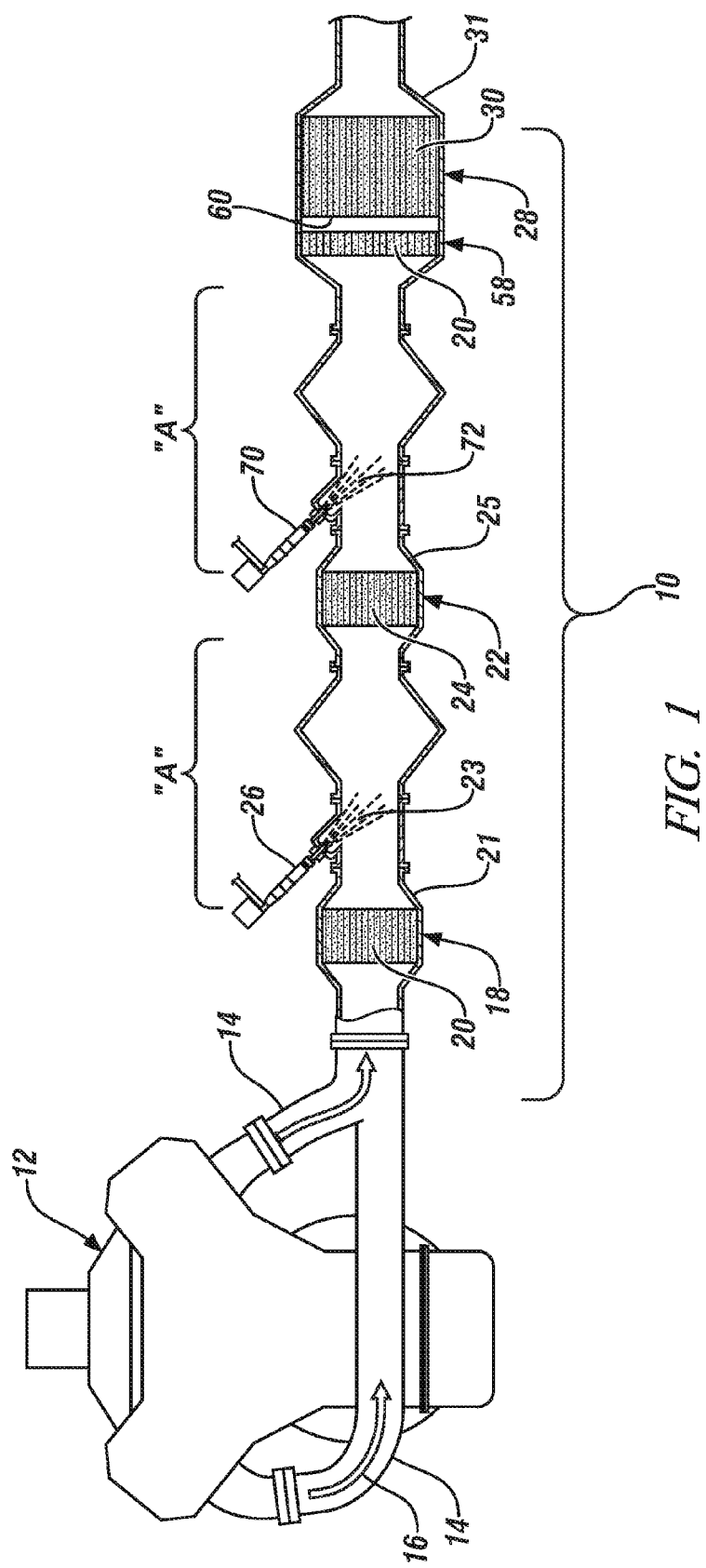
FIG. 1 is a partial schematic view of an exhaust gas treatment system for an internal combustion engine embodying features of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, an exemplary embodiment of the invention is directed to an exhaust gas treatment system, referred to generally as 10, for receiving exhaust gas 16 from an internal combustion engine 12. The internal combustion engine 12, may include, but is not limited to diesel, gasoline direct injection and homogeneous charge compression ignition engine systems.

The exhaust gas treatment system includes an exhaust gas conduit 14, which may comprise several segments that functions to transport exhaust gas 16 from the internal combustion engine 12 to the various exhaust treatment devices of the exhaust gas treatment system 10. The exhaust treatment devices may include an oxidation catalyst ("OC") device 18. An OC device 18 may typically comprise a flow-through metal or ceramic monolith substrate 20 that is packaged in a rigid shell or canister 21 having an inlet and an outlet in fluid communication with the conduit 14. The substrate has an oxidation catalyst compound (not shown) disposed thereon. The oxidation catalyst compound may be applied as a washcoat, for example, and may contain platinum group metals such as platinum (Pt), palladium (Pd), rhodium (Rh) or other suitable oxidizing catalysts or a combination thereof. The OC device 18 is useful to treat unburned gaseous and non-volatile HC and CO, which are oxidized to form carbon dioxide and water.

A selective catalyst reduction (SCR") device 22 may be disposed downstream of the OC device 18 and, in a manner similar to the OC device, may also include a flow through ceramic or metal monolith substrate 24 that is packaged in a rigid shell or canister 25 having an inlet and an outlet in fluid communication with the conduit 14. The substrate 24 has an SCR catalyst composition (not shown) applied thereto. The SCR catalyst composition preferably contains a zeolite and one or more base metal components such as iron ("Fe"), cobalt ("Co"), copper ("Cu") or vanadium ("V") which operate efficiently to convert NOx constituents in the exhaust gas 16, in the presence of an ammonia based ("NH3") injected reductant fluid such as urea 23. The NH3 reductant fluid 23 may be injected into the exhaust gas conduit 14 at a location upstream of the SCR device 22 using an injector 26.

In an exemplary embodiment, an exhaust gas filter assembly ("PF") 28 is located in the exhaust gas treatment system 10 downstream of the SCR device 22 and filters the exhaust gas 16 of carbon and other particulates. The PF 28 may be constructed using a ceramic wall-flow monolith filter 30 that is packaged in a rigid shell or canister 31. The canister has an inlet and an outlet in fluid communication with the exhaust gas conduit 14. Exhaust gas entering the filter 30 is forced to migrate through adjacent, longitudinally extending walls (not shown) and, it is through this wall-flow mechanism that the exhaust gas 16 is filtered of carbon and other particulates. The filtered material is deposited in the filter 30 and, over time, will have the effect of increasing the exhaust gas backpressure imposed upon the internal combustion engine 12 by the exhaust gas treatment system 10. It is appreciated that the ceramic wall-flow monolith filter described is merely exemplary in nature and that the PF 28 may comprise other filter types with similar effect.

In an exemplary embodiment, the increase in exhaust gas backpressure caused by the accumulation of particulate matter requires that the filter 30 of the PF 28 be periodically cleaned or regenerated. Regeneration involves the oxidation or burning of the accumulated carbon and particulates in what is typically a high temperature event. For regeneration purposes, a second oxidation catalyst ("OC2") 58 maybe located upstream of the filter 30. In the embodiment illustrated in FIG. 1, the OC2 is positioned closely adjacent to the upstream end 60 of the filter 30 and is housed in the same canister 31, although other configurations are anticipated. Disposed upstream of the OC2 58, in fluid communication with the exhaust gas 16 in the exhaust gas conduit 14 is an injector 70. The injector 70 is configured to introduce unburned hydrocarbon ("HC") such as fuel 72 into the exhaust stream for delivery to the OC2 58 and oxidation therein. Oxidation of the fuel in the OC2 58 will heat the exhaust gas 16 to a temperature sufficient to burn the accumulated carbon and particulates as in the filter 30 thereby regenerating the PF 28 and preparing it for continued use.

Figure 2:
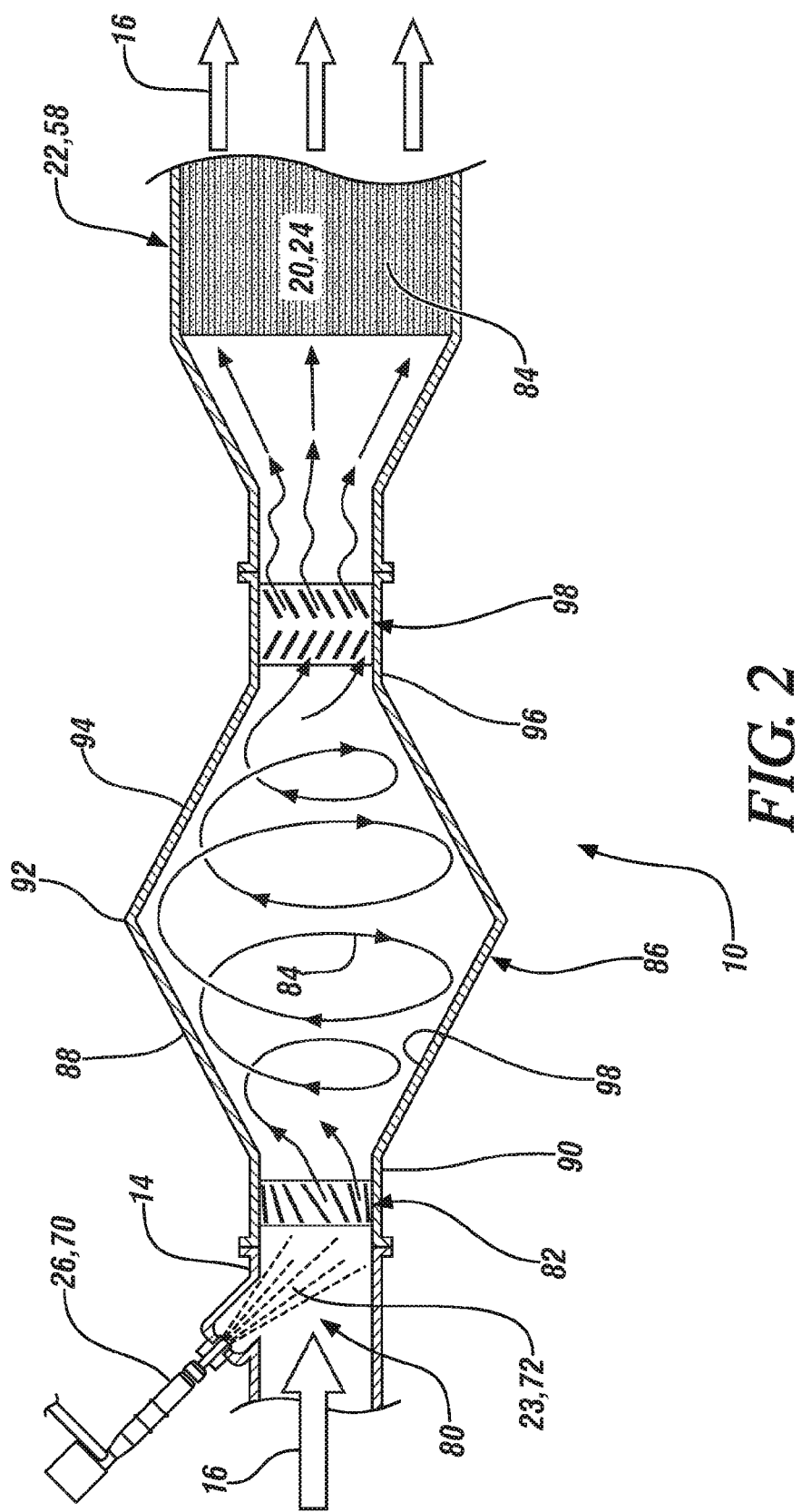
FIG. 2 is an enlarged view of a portion of the exhaust treatment system of FIG. 1 taken at one of noted sections "A"

In an exemplary embodiment, and referring to FIG. 2 with continuing reference to FIG. 1, an enlarged section "A" of exhaust treatment system 10 is shown. As can be seen in FIG. 1 section A is called out in two locations and the following description may apply equally to either with the substitution of downstream devices (SCR device 22 or OC2 device 58) and injected fluids (urea reductant 23 or fuel 72). It should be noted that the injection of an NH3 containing reductant such as urea 23 or an HC such as fuel 72 upstream of an SCR device 22 and an OC2 58, respectively will typically derive the desired performance when the fluid 23, 72 is either finely atomized, pre-vaporized, or chemically converted as well as completely distributed within the exhaust gas 16 prior to entering the downstream device 22, 58. Failure to achieve any of these properties will reduce the effectiveness of the catalyst components resident on the substrates 20, 24 as the exhaust gas and fluid mixture flow through the device. With larger vehicles (and most stationary applications) exhaust gas/fluid mixing length and residence time can easily be achieved by extending the length between the fluid injector 26, 70 and the receiving device. In small vehicle applications, for example, packaging space may be limited for exhaust aftertreatment requiring new strategies to achieve mixing and preparation of fluids 23, 72 with the exhaust gas 16.

Figure 3:
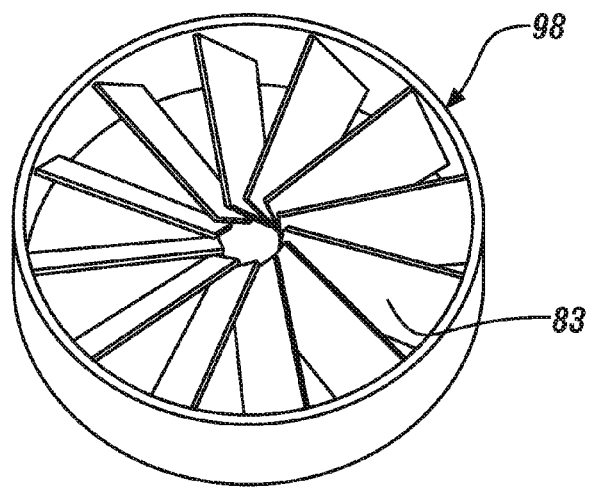
FIG. 3 is an exemplary illustration of a breakup mixer embodying features of the present invention.

In an embodiment a fluid injector 26, 70 properly selected to achieve proper penetration and atomization of the injected fluid 23, 72 into the exhaust gas 16 at the fluid injection location 80 and will assist in initial development of the fluid into small droplets that are well distributed into the exhaust flow in the conduit 14. Downstream of the fluid injection location 80, in an exemplary embodiment, a breakup mixer 82 is disposed in the exhaust conduit 14. The breakup mixer assists with the breakup of any large fluid droplets as they are difficult to distribute and evaporate due to their larger mass. In an embodiment, the breakup mixer 82 is configured to provide surface area 83 for liquid to impinge and break up as well as to impart a radially outward oriented swirl to the flow of the exhaust gas 16 and fluid 23, 72, the effects of which will be discussed below. An exemplary breakup mixer 82 is illustrated in FIG. 3.

In an exemplary embodiment, following passage through the breakup mixer 82, the fluid and exhaust gas mixture 84 (may contain exhaust gas 16 and fuel 72 or exhaust gas and urea 23) is discharged into an evaporation volume or "bulge" 86. The evaporation volume 86 is configured as an open volume that is free of any exhaust treatment device. The evaporation volume 86 slows the bulk velocity of the exhaust gas flow to thereby increase the residence time of the exhaust gas mixture 84 therein, allowing time for evaporation to occur. In addition, the radially outwardly oriented swirl imparted by the breakup mixer 82 moves the mixture to the outside of the volume increasing the path length and thereby the residence time of the exhaust gas mixture 84 in the evaporation volume 86. In the exemplary embodiment illustrated in FIG. 2, the evaporation volume 86 is configured as a dual conical structure having a first, expansion cone portion 88 extending from the inlet 90 to central region 92 where it joins a second, compression cone portion 94 that extends from the central region to an outlet 96. The central region 92 is configured as an intersection point, such that expansion cone portion 88 and the compression cone portion 94 intersect therein. The expansion cone portion 88 and the compression cone portion 94 extend away from each other at an obtuse angle such that the expansion cone portion 88 and the compression cone portion 94 extend generally in opposite directions. The configuration of the evaporation volume 86 illustrated, is effective to gradually reduce exhaust flow velocity as the exhaust gas 16 flows from the inlet 90 towards the central region 92 due to the gradually increasing circumference of the first, expansion cone portion 88. Additionally, the conical configuration promotes a smooth flow of the swirling exhaust gas 16 outwardly and long the inner wall 98 of the evaporation volume 86 to enhance the residence time of the exhaust gas and fluid mixture 84 therein and to avoid unused zones within the volume. While the evaporation volume 86 is illustrated in a conical format in the schematic of FIG. 2, it should be noted that virtually any configuration that will achieve the slowing and vaporizing effects of the bulge 86, as described, is contemplated. Other contemplated configurations may include evaporation volumes 86 having round, oval and rectangular cross-sections.

Figure 4:
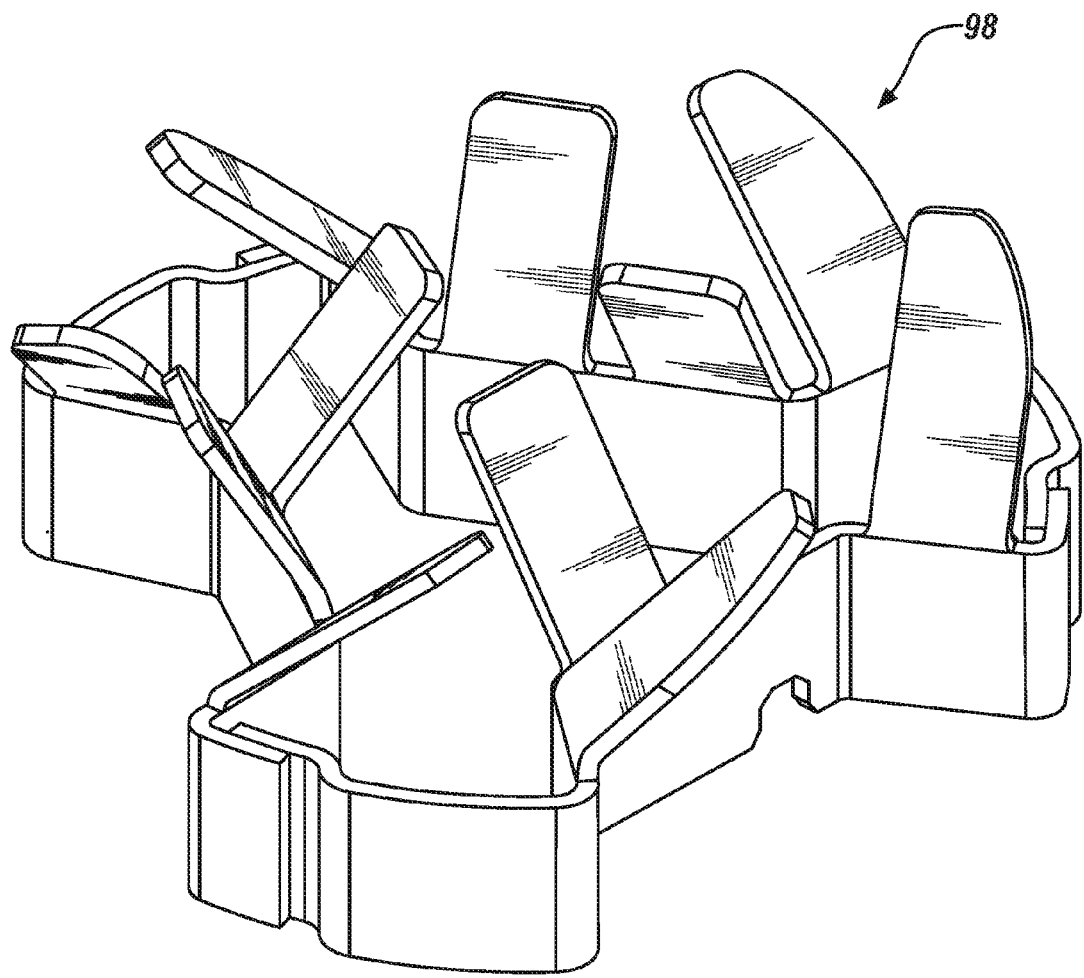
FIG. 4 is an exemplary illustration of a distribution mixer embodying features of the present invention.

Referring to FIG. 4 with continuing reference to FIG. 2, the exhaust gas and liquid mixture 84 exiting the evaporation volume 86 is re-accelerated as it passes through the second, compression cone portion 94 towards the outlet 96. As the mixture exits the evaporation volume 86 if it is not yet in a homogeneous form (i.e. the liquid and exhaust gas are a homogeneous mixture) it is further homogenized and distributed evenly across the face of the downstream catalyst substrate 20, 24 by passing the mixture through a distribution mixer 98 disposed in the exhaust conduit 14. The distribution mixer 98 may comprise a turbulator-style mixer which imparts a distributing turbulence to the exhaust gas 16 assuring proper homogenization prior to release of the fluid and exhaust gas mixture 84 to the respective OC device 18 or SCR device 22.

Reasonable performance improvement has been achieved from the exemplary embodiments described with desirable mixing of injected exhaust fluids in one third to one half of the typical mixing length distance of standard systems without the described improvements. Furthermore, a better compromise between low and high exhaust flow rates can often be achieved. In exemplary embodiments, and depending upon the initial spray quality and placement into the exhaust gas flow, all parts of the system described herein may not be necessary.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope oft the disclosure.

What is claimed is:

1. An exhaust gas treatment system for an internal combustion engine having improved mixing of an injected fluid comprising:

an exhaust gas conduit;

a fluid injector in fluid communication with the exhaust gas conduit configured to deliver a fluid into an exhaust gas;

a breakup mixer disposed in the exhaust conduit downstream of the fluid injector and configured to breakup the fluid;

an evaporation volume disposed in the exhaust conduit downstream of the breakup mixer, the evaporation volume is configured as an open volume that is free of any exhaust treatment devices and configured to slow a bulk velocity of the fluid and exhaust gas mixture to thereby increase a residence time of the fluid and exhaust gas mixture therein;

a distribution mixer disposed in the exhaust conduit downstream of the evaporation volume and configured to homogenize and distribute the fluid and exhaust gas mixture; and at least one of an oxidation catalyst and a selective catalyst reduction device disposed within a canister downstream of the evaporation volume configured to receive the fluid and exhaust gas mixture exiting the evaporation volume.

2. The exhaust gas treatment system of claim 1, wherein the fluid injector is configured to develop high penetration and atomization of the injected fluid into the exhaust gas at the fluid injection location.

3. The exhaust gas treatment system of claim 1, wherein the breakup mixer comprises a surface area for liquid impingement and break-up and to impart a radially outwardly oriented swirl to the flow of the exhaust gas and the fluid.

4. The exhaust gas treatment system of claim 1, wherein the evaporation volume comprises a dual conical structure having a first, expansion cone portion extending from an inlet to a central region, the central region configured as an intersection point, and a second, compression cone portion that extends from the central region to an outlet.

5. The exhaust gas treatment system of claim 4, wherein the first, expansion cone portion comprises an increasing circumference extending from the inlet to the central region.

6. The exhaust gas treatment system of claim 4, wherein the second, compression cone portion comprises a decreasing circumference extending from the central region to the outlet.

7. The exhaust gas treatment system of claim 1, wherein the distribution mixer comprises a turbulator-style mixer.

8. The exhaust gas treatment system of claim 1, wherein the fluid comprises NH3 based reductant.

9. The exhaust gas treatment system of claim 1, wherein the fluid comprises an HC fluid.

10. A method of mixing a fluid in an exhaust gas in an exhaust gas treatment system for an internal combustion engine:

delivering an exhaust gas from an internal combustion engine to an exhaust gas conduit;

injecting a fluid into the exhaust gas through a fluid injector disposed downstream of a first catalyst in fluid communication with the exhaust gas conduit;

passing the exhaust gas and fluid mixture through a breakup mixer disposed in the exhaust conduit downstream of the fluid injector and configured to breakup the fluid;

delivering the exhaust gas and fluid mixture to an evaporation volume disposed in the exhaust conduit downstream of the breakup mixer, the evaporation volume free of any exhaust treatment devices and configured to slow a bulk velocity of the exhaust gas and fluid mixture to thereby increase a residence time of the exhaust gas and fluid mixture therein;

passing the exhaust gas and fluid mixture through a distribution mixer disposed in the exhaust conduit downstream of the evaporation volume and upstream of a second catalyst disposed adjacent to the evaporation volume and in fluid communication with the exhaust gas conduit, the evaporation volume configured to homogenize and distribute the exhaust gas and fluid mixture; and delivering the exhaust gas and fluid mixture to the second catalyst configured to receive the fluid and exhaust gas mixture.

\* \* \* \* \*